United States Patent [19]

Takahara

[11] Patent Number: 5,188,329
[45] Date of Patent: Feb. 23, 1993

[54] STRUCTURE FOR COVERING SLIDE RAIL IN SEAT ADJUSTER

[75] Inventor: Masatoshi Takahara, Akishima, Japan

[73] Assignee: Tachi-S Co. Ltd., Tokyo, Japan

[21] Appl. No.: 780,948

[22] Filed: Oct. 23, 1991

[51] Int. Cl.$^5$ .............................................. B60N 2/06
[52] U.S. Cl. .............................. 248/430; 248/345.1; 297/344
[58] Field of Search ............ 248/430, 429, 420, 345.1; 297/344

[56] References Cited

U.S. PATENT DOCUMENTS

| | | | |
|---|---|---|---|
| 4,717,194 | 1/1988 | Ota et al. | 248/430 X |
| 4,892,282 | 1/1990 | Suzuki et al. | 248/430 |
| 5,039,166 | 8/1991 | Kojho | 248/429 X |

FOREIGN PATENT DOCUMENTS

| | | |
|---|---|---|
| 65131 | 5/1985 | Japan . |
| 3930 | 1/1990 | Japan . |
| 24728 | 2/1990 | Japan . |
| 57735 | 4/1990 | Japan . |
| 60621 | 5/1990 | Japan . |
| 126935 | 10/1990 | Japan . |

*Primary Examiner*—Alvin C. Chin-Shue
*Attorney, Agent, or Firm*—Oldham, Oldham & Wilson Co.

[57] ABSTRACT

A structure for covering a slide rail in a seat adjuster, wherein there is provided a cover member having, formed at its rear end, a covering part for covering the rear end side of lower rail of the seat adjuster, with the arrangement that the cover member is movable along the lower rail via a rolling element retainer, so as to keep covering the rear side of seat adjuster positively.

8 Claims, 5 Drawing Sheets

STRUCTURE FOR COVERING SLIDE RAIL IN SEAT ADJUSTER

BACKGROUND OF INVENTION

1. Field of the Invention

The present invention relates to a structure for covering a slide rail in a seat adjuster for adjusting the fore-and-aft positions of a vehicle seat, which is provided between the seat and floor of vehicle or automobile.

2. Description of Prior Art

A seat adjuster for adjustment of seat position in the fore-and-aft direction within a cabin of automobile is widely available in order for an occupant on the seat to locate the seat at his or her desired position or to move the seat forwardly for allowing another occupant to enter into a rear seat.

An example of conventional seat adjuster of this kind is shown in FIGS. 1 and 2. This seat adjuster (2) is adapted for adjusting the fore-and-aft position of a seat (1). FIG. 1 depicts a rearward side of the seat (1) wherein it can be seen that a pair of upper rails (5)(5) fixed to the seat (1) is fitted slidably in the respective pair of lower rails (4)(4) and that the lower rails (4)(4) are fixed via the respective support legs members (3) to a floor side of an automobile (not shown). Referring to FIG. 2, a cover member (6) of cap type is fitted onto the rearward end edge (4a1) of the lower rail (4), as indicated by the phantom line. The purpose of such cover member (6) is for avoiding a contact of shoes toe of an occupant on a rear seat with such rearward end edge (4a1) of lower rail (4) so that when the upper rail (5) is moved forwardly, leaving the rearward part (4a) of mating lower rail (41) exposed from the seat (1), the edge (4a1) in question are protected by the cover member (6) against damage such as kick from the shoes toe of that rear-seat occupant.

This covering arrangement for the lower rail rearward edge (4a1) may certainly be valued in terms of its protection and improvement in outer appearance of the rearward part (4a) of lower rail (4), but it has been found defective that a rivet (7a), which firmly connects together the lower rail rearward part (4a) and support leg member (3), is not concealed by the cover member (6), thus resulting in exposure of the rivet head (7a). Consequently, such protruding rivet head (7a) not only looks quite objectionable but also requires painting in a same color with that of lower rail (4), which further results in a complicated and laborsome assemblage. What is worse, a lubricant residue on the lower rail (4) will be easily and more frequently adhered to a cloth of occupant sitting on a rear seat.

SUMMARY OF THE INVENTION

In view of the above-discussed shortcomings, it is a first purpose of the present invention to provide an improved structure for covering slide rail in a seat adjuster, by which can be concealed the rearward terminal edges of lower rail of seat adjuster and also the rearward appearance of lower rail inclusive.

To attain this purpose, according to the present invention, the structure, using a slide rail having an upper rail and lower rail, the former being slidably fitted to the latter, is such that a cover member is slidably provided over the lower rail in its longitudinal direction for covering a rearward side of said lower rail, and a rolling element retainer is interposed between the upper and lower rails, which retainer is operatively coupled to the cover member.

Preferably, the cover member is formed in a plate-like configuration covering the upper side of lower rail, with a dependent part for covering the rearward side of lower rail.

The cover member and rolling element retainer may be formed together integrally, using a same material, for facilitating the ease of inserting them into the slide rail.

It is a second purpose of the present invention to make easier coupling of the cover member to the rolling element retainer.

To achieve this purpose, the forward end of cover member is formed with an engagement recess and the rearward end of rolling element retainer is formed with an engagement lug. Accordingly, in the assemblage, after having inserted the retainer into the slide rail, simply inserting the cover member thereinto to cause engagement of the retainer's lug into the engagement recess of cover member presents much easier and quicker installation of the present covering structure in the slide rail.

It is a second purpose of the invention to insure a positive coupling of the cover member to the rolling element retainer.

To achieve the purpose, a pair of vertically spaced-apart of lugs are formed at the forward end of cover member, with a securing projection being provided between such two lugs such as to erect on one of the lugs extending towards another of them with a clearance, whereas an engagement hole is formed at the rearward end of retainer, so that to engage the securing projection into the engagement hole places that projection between the two lugs, to thereby insure preventing removal of the projection from the engagement hole.

In one aspect of the invention, the rolling element retainer may be formed with an opening within which a roller is free to be idly rolled. In such arrangement, the roller is contacted directly with both upper and lower rails and the opening of retainer is of a given lengthwise width, whereby the upper rail may be moved along the lower rail, leaving the cover member unmoved, until the roller collides either edge of opening. This prevents extreme projection of cover member, it its coactive relation with the upper rail, towards the rear side of slide rail.

DETAILED DESCRIPTION OF PREFERRED EMBODIMENTS OF THE INVENTION

Figure 1:
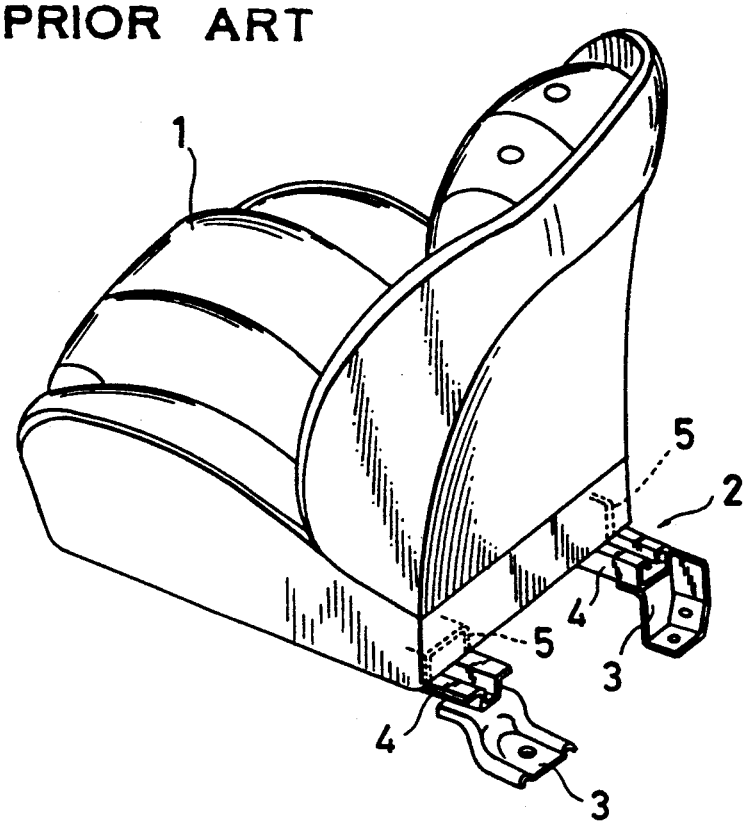
FIG. 1 is a perspective view of a vehicle seat with a seat adjuster.
Figure 2:
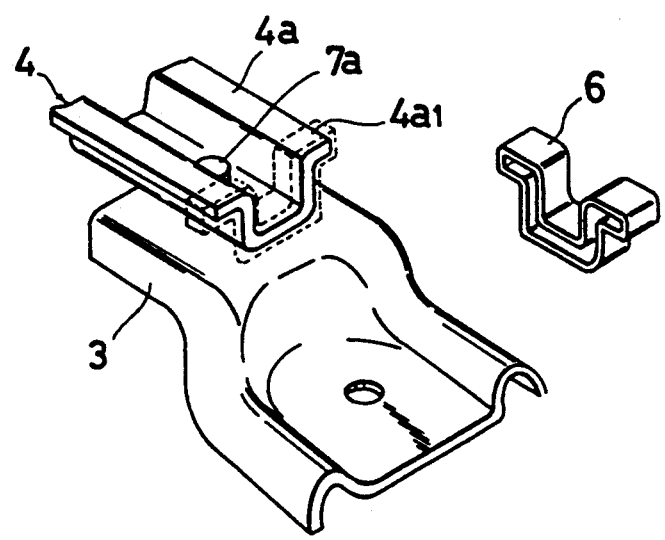
FIG. 2 is a schematic, partly broken, perspective view of a conventional structure for covering the slide rail of seat adjuster.
Figure 3:
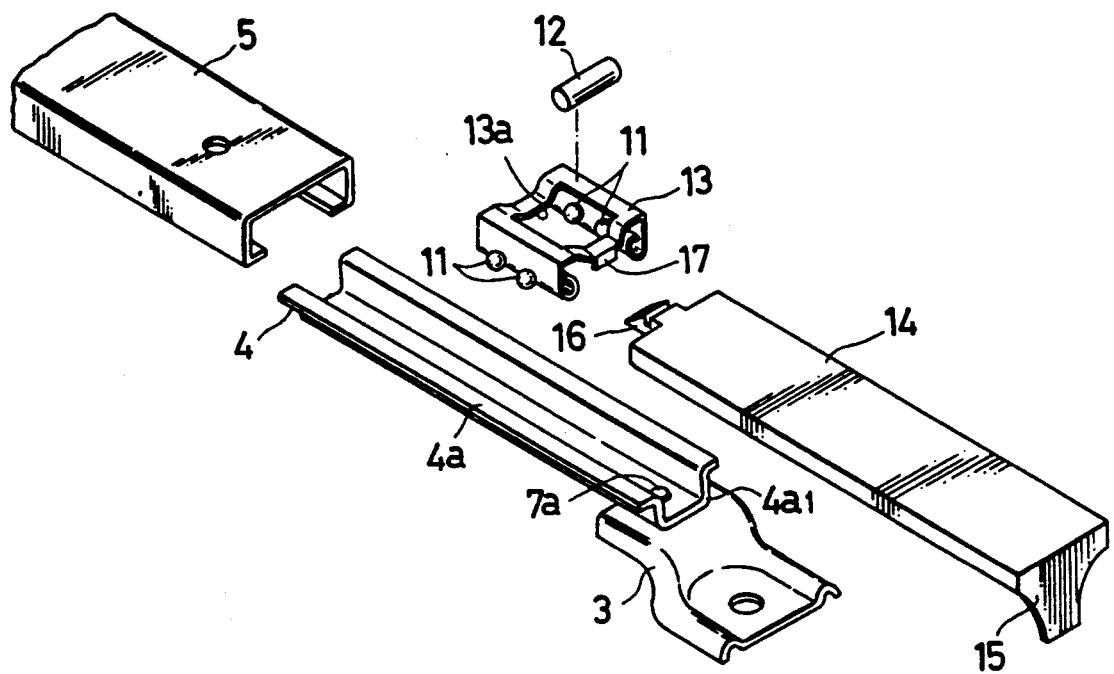
FIG. 3 is a partly broken, exploded perspective view of principal parts of a first embodiment of the present invention.
Figure 4:
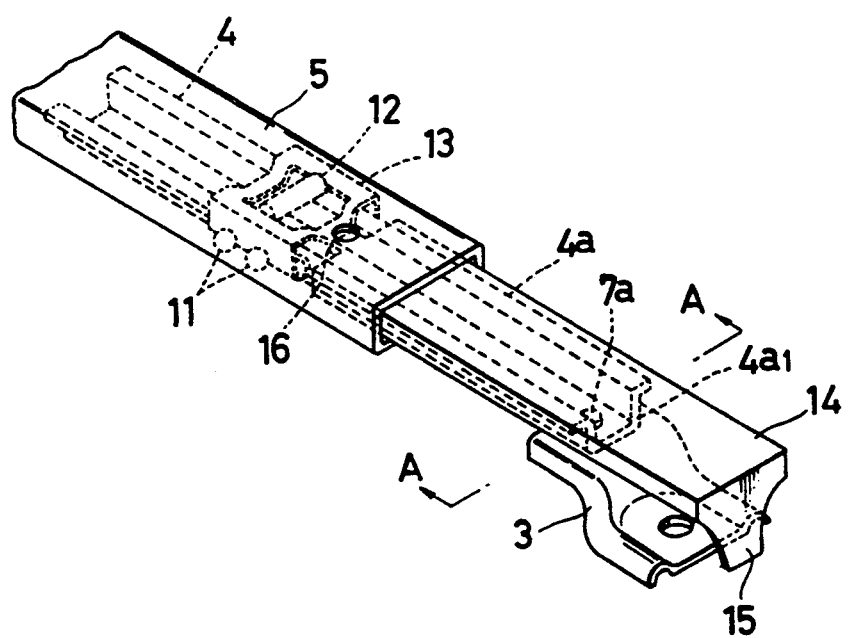
FIG. 4 is a partly broken perspective view of the first embodiment, showing its assembled state.
Figure 5:
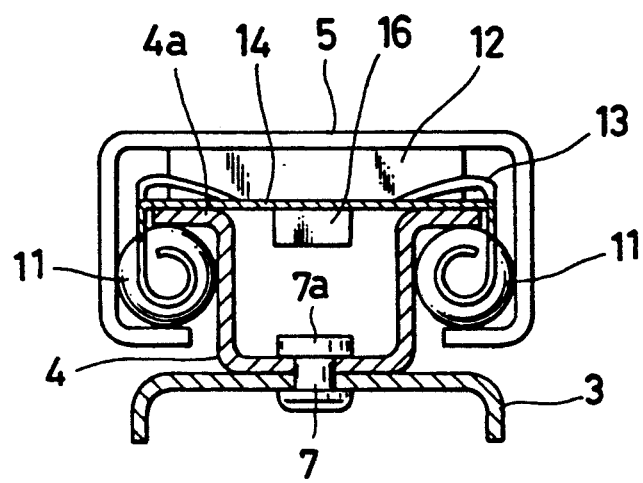
FIG. 5 is a sectional view taken along the line A—A in FIG. 4.

With reference to FIGS. 3 through 5, there is illustrated a first embodiment of the present invention, wherein a structure for covering a slide rail is shown as being an improvement based upon the same slide rail associated with the same seat adjuster as in the previously stated prior art. Thus, all like designations given hereinafter correspond to all like ones used in the prior art description, and as such, specific explanation thereon is deleted for the sake of simplicity.

The structure for covering the slide rail (4,5), in this first embodiment, basically comprises a cover member (14) and rolling element retainer (13), which are interposed between the associated lower and upper rails (4)(5). The cover member (14) is so formed as to overlie the lower rail (4), extending its covering range to both lateral sides at (4a) and rearward end side at (4a1) of same rail (4), and having such a length extending to a degree that the forward free end of the cover member (14) opposite to its rearward end (15) is located a small distance more forwardly than the forward slide limit point at which the upper rail (5) is limited its foremost movable range. The rolling element retainer (13) is of such formation as to retain a cylindrical roller (12) and plural steel balls (11).

Specifically, the cover member (14) is of a plate-like configuration extending along the longitudinal direction of the lower rail (4), and having, formed at its rearward end, an integral dependent cover section (15) which extends vertically from the horizontal body such as to cover the rearward end (4a1) of lower rail (4) and support leg member (3). The free end of cover member (14) is formed with a hook-like engagement part (16) whose forward end is provided with a sloped surface and recessed part as shown. Hence, the cover member (14) effectively covers both rearward end portion of lower rail (4) and support leg member (3), thus improving aesthetically the rear side of the seat (1).

On the other hand, the rolling element retainer (13) is shaped generally in an inverted U configuration to embracingly engage both lateral parts (4a) of lower rail (4) in a slidable way, and the rearward end of retainer (13) is formed with a downwardly projected engagement pawl part (17). Centrally of the retainer (13), a rectangular opening (13a) is perforated, and the roller (12) is of a length smaller than the width of opening (13a), such that the roller (12) is disposed movably within the opening (13a) and sandwiched between the upper wall of upper rail (5) and both lateral sides (4a) of lower rail (4). Both lower lateral sides of retainer (13) are so formed to accommodate therein the steel balls (11) in a rotatable way. It is important that the roller (12) is in a direct, close contact with both upper and lower rails (5)(4), while by contrast, the steal balls (11) are relatively loosely retained between the two rails (5)(4), as seen from FIG. 5. Further, it is essential that the opening (13a) has such length in the longitudinal direction of slide rail (4, 5) that allows idly rolling of the roller (12) therein, to thereby allow sliding movement of the upper rail (5) along the lower rail (4) independently of the retainer (13). Accordingly, the retainer (13) is kept unmoved until the roller (12) collides against either of inner forward and rearward edges of retainer (13) in the opening (13a), and thus, with the roller (12) contacted with one of those retainer edges, the retainer (13) is moved together with the upper rail (5) along the lower rail (4), which in turn causes the cover member (14) to be slidingly moved along the lower rail (4). It is therefore appreciated that the cover member (14) moves a smaller distance than the upper rail (4) does, with respect to the lower rail (4), and for that purpose, it preferable to form the opening (13a) to have a length at such a degree that causes the cover member (14) to be moved less than a half of distance at which the upper rail (5) is moved, with respect to the lower rail (4). In that way, the cover member (14) is not projected extremely in the direction rearwardly of the seat (1). Namely, the rearward end (at 15) of the cover member (14) is limited its rearward movement in a proper minimum range that avoids its contact with the shoes of an occupant sitting on a rear seat.

In the assemblage, the first step consists in fitting the upper rail (5) over the lower rail (4), with the retainer (13) being interposed therebetween, and then inserting the free forward end of cover member (14) into between thus-assembled upper and lower rails (5)(4) so as to cause the engagement pawl part (17) of retainer (13) to be engaged in the recess of the engagement part (16) of cover member (14), as shown in FIG. 4.

According to the present first embodiment, the rearward end portion of lower rail (4) and support leg member (3) are covered entirely by the cover member (3), which is also advantageous in eliminating a step for coloring the rivet head (7a) in the same color with surrounding parts and keeping away the lubricant residue on the lower rail (4) from a cloth of an occupant sitting on a rear seat.

Figure 6:
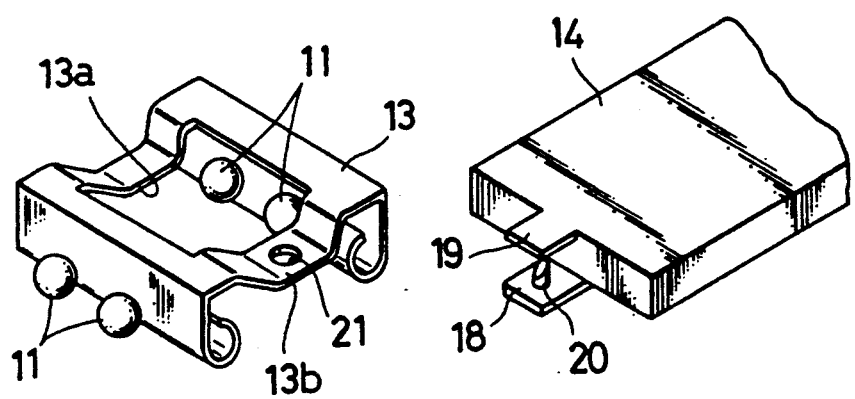
FIG. 6 is partly broken, exploded perspective view of principal part of a second embodiment of the invention.
Figure 7:
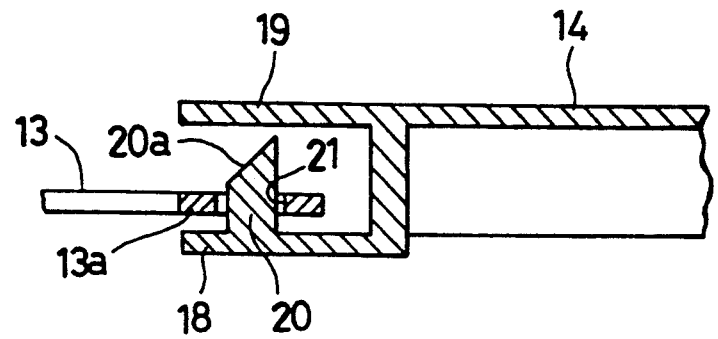
FIG. 7 is a sectional view of the second embodiment as in FIG. 6.

FIGS. 6 and 7 show a second embodiment of the present invention which is directed to another mode of jointing the retainer (13) with the cover member (14). That is, in place of the cover member engagement part (16) and retainer engagement pawl part (17) in the first embodiment, an engagement hole (21) is formed at the rearward end side (13a) of retainer (13) and a pair of spaced-apart support lugs (18)(19) are formed at the forward end of cover member (14), with an engagement projection (20) erecting on the lower one (18) of the two support lugs. The engagement projection (20) is formed at its upper end portion with a sloped surface (20a). Thus, by inserting the cover member (14) into between the upper and lower rails (5)(4), the projection (20) is click fitted into the hole (21), as shown in FIG. 7. In this particular embodiment, the rearward end side (13a) of retainer (13) is situated between the two support lugs (18)(19), to thereby be positively jointed with the cover member (14) against removal therefrom, since the lugs (18)(19) serves to limit vertically the retainer rearward end side (13b).

Figure 8:
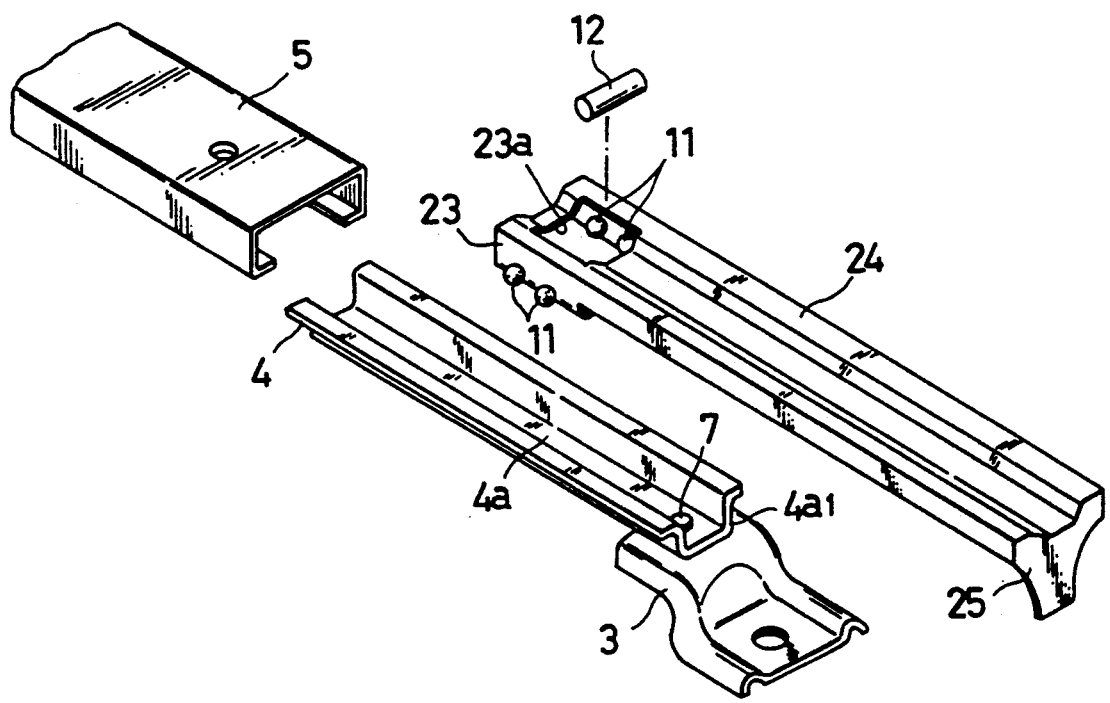
FIG. 8 is a partly broken, exploded perspective view of principal parts of a third embodiment.
Figure 9:
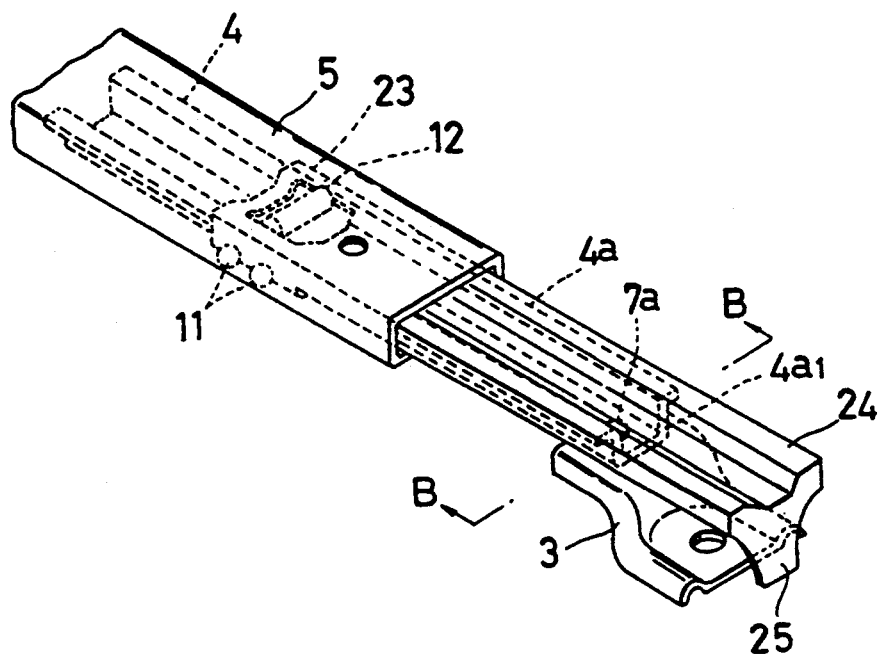
FIG. 9 is a partly broken perspective view of the third embodiment, showing its assembled state.
Figure 10:
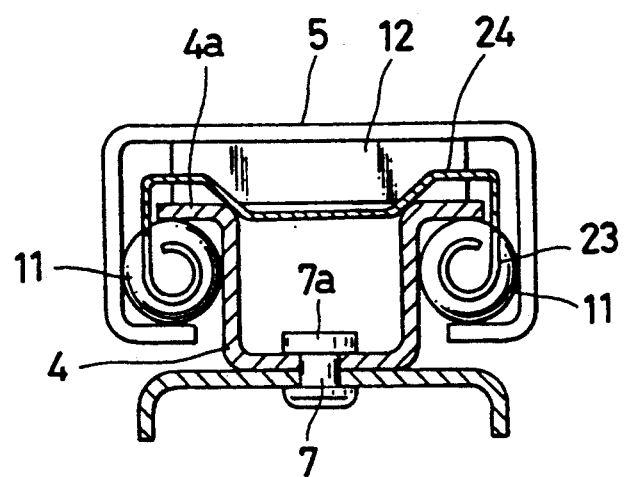
FIG. 10 is a sectional view taken along the line B—B.

FIGS. 8, 9 and 10 show a third embodiment of the present invention which is directed to another mode of cover member (14) to provide a cover member (24) which is integrally formed with a rolling element retainer section (23), in place of the separate retainer (13) of the first embodiment. The retainer section (23) is formed in the same manner as in the retainer (13), with the same rectangular opening (23a) formed therein, which of course has the same functions to control the movable range of the cover member (24) in relation to that of upper rail (5), as in the first embodiment. This construction is extremely simplified among other embodiments above, reducing the number of parts, assemblage steps and costs involved.

The present invention is not necessarily limited to the illustrated embodiments, but any other modifications, replacements and additions may structurally be possible without departing from the scopes and spirits of the appended claims. For example, the cover member (14) may be formed from a synthetic resin or metallic plate material.

What is claimed is:

1. A structure for covering a slide rail in a seat adjuster, in which said slide rail includes an upper rail on which is mounted a seat and a lower rail fixed on a floor side, said upper rail being slidably fitted to said lower rail, said structure comprising:

a retaining means for retaining a rolling element, said retaining means being interposed between said upper and lower rails; and a cover member slidably provided over said lower rail such as to be slidable in a longitudinal direction thereof, said cover member being for covering a rearward side of said lower rail and operatively coupled to said retaining means.

2. The structure as defined in claim 1, wherein said cover member is of a plate-like configuration to cover the upper side of said rearward side of said lower rail and further is integrally formed with said retaining means.

3. The structure as defined in claim 1, wherein said lower rail is at its rearward end portion fixed via a support leg member to said floor side, and wherein said cover member is so formed as to cover an upper side and both lateral sides of said lower rail and also cover a rear side of said support leg member.

4. The structure as defined in claim 2, wherein one of said cover member and said retaining means is formed with a hook-like engagement part and another of them is formed with a downwardly extended pawl part, and wherein said pawl part is engaged into said hook-like engagement part, so as to joint together said cover member and retaining means.

5. The structure as defined in claim 2, wherein a forward end of said cover member is formed with a pair of spaced-apart support lugs, one of which lugs has an engagement projection erected towards another of said lugs, with a predetermined clearance provided between said said projection and said another of said lugs, wherein said engagement projection is at its free end formed with a sloped surface, and wherein said retaining means is formed at its rearward end part with an engagement hole, whereby said engagement projection is engaged into said engagement hole by inserting said rearward end part of said retaining means into between said two support lugs, so as to jont together said cover member and retaining means.

6. The structure as defined in claim 1, wherein said retaining means and said cover member are formed together integrally.

7. The structure as defined in claim 1, wherein said retaining means comprises a generally inverted U-shaped body having an opening formed centrally thereof, whose lower lateral sides accommodate therein plural steel balls, and a roller which is disposed in said opening such as to control the movable range of said cover member at smaller degree than that of said upper rail, with respect to said lower rail.

8. The structure as defined in claim 1, wherein said cover member is made of one selected from a group consisting of a synthetic resin material and metallic material.

* * * * *